United States Patent [19]

Hommen et al.

[11] Patent Number: 5,147,114
[45] Date of Patent: Sep. 15, 1992

[54] ELECTRICALLY CONTROLLABLE PRESSURE MEDIUM BRAKE FOR VEHICLES

[75] Inventors: Winfried Hommen; Georg Stäuble, both of Munich; Thomas Störzinger, Stamberg; Tiberius Wieser; Thomas Wissler, both of Munich, all of Fed. Rep. of Germany

[73] Assignee: Knorr-Bremse AG, Fed. Rep. of Germany

[21] Appl. No.: 646,274

[22] Filed: Jan. 28, 1991

[51] Int. Cl.$^5$ .............................................. B60T 8/18
[52] U.S. Cl. ........................................ 303/15; 303/9; 303/DIG. 2
[58] Field of Search ................... 188/151 A, 153 R; 303/22.4, 22.6, 3, 15, 16, DIG. 1, DIG. 2, 9

[56] References Cited

U.S. PATENT DOCUMENTS

| | | | |
|---|---|---|---|
| 4,139,239 | 2/1979 | Staüble et al. | 303/69 X |
| 4,536,039 | 8/1985 | Barberis | 303/16 |
| 4,564,245 | 1/1986 | Barberis | 303/15 |
| 4,592,597 | 6/1986 | Hommen et al. | 303/15 |
| 4,645,271 | 2/1987 | Brearey et al. | 303/15 X |
| 4,682,823 | 7/1987 | Hommen et al. | 303/22.4 |

Primary Examiner—Matthew C. Graham
Assistant Examiner—Josie A. Ballato
Attorney, Agent, or Firm—Pollock, Vande Sande & Priddy

[57] ABSTRACT

The electrically controllable pressure medium brake comprises an electric pressure means (EP) converter (1) to convert an electrical brake request signal into a brake pressure. By way of an emergency brake valve (1), this brake pressure (in the normal case) and a vehicle load-dependent emergency brake pressure limited by a limiting valve (12) (in an emergency), is fed to the brake cylinder (14). For vehicle load-dependent limitation of the emergency brake pressure, a second EP converter (1a) generates from a vehicle load-dependent, electrical signal a vehicle load-dependent pressure medium pressure, which is stored in a pressure medium reservoir (18) and is fed to the limiting valve (12) in order to control it. The second EP converter (1a) is closed in the currentless state, during a power failure, whereby the vehicle load-dependent pressure medium pressure is preserved and the limiting valve (12) can thus continue to limit the emergency brake pressure as a function of the vehicle load. In another embodiment supplemented by a switching valve, only one EP converter serves to generate both the brake pressure and the vehicle load-dependent pressure medium pressure.

9 Claims, 3 Drawing Sheets

ELECTRICALLY CONTROLLABLE PRESSURE MEDIUM BRAKE FOR VEHICLES

FIELD OF THE INVENTION

The invention relates to an electrically controllable pressure medium brake for vehicles, in particular rail vehicles, comprising a control system that can be controlled with an electrical brake request signal to generate a brake pressure corresponding to the brake request signal, where the control system exhibits an emergency brake device effective in emergency states, in particular with a power failure, to generate an emergency brake pressure that corresponds to a maximum braking force and is defined by an electric vehicle load signal as a function of the vehicle load, and comprising an emergency brake valve, which feeds the brake pressure to a brake cylinder during normal operations and the emergency brake pressure to a brake cylinder in a state of emergency by blocking the brake pressure.

PRIOR ART

Such a pressure medium brake is known from the EP-B-0 173 861. The emergency brake system comprises a cam which is driven by a servomotor with a gearing, and which determines the prestress of a governing spring, belonging to a pressure limiting valve, by means of a plunger. The servomotor can be controlled as a function of the vehicle load in such a manner that the pressure limiting valve limits the emergency brake pressure as a function of the load. This emergency brake pressure limited as a function of the vehicle load is fed, on the one hand, to an emergency brake valve and, on the other hand, as feed pressure to an EP converter to generate the brake pressure, which is also led to the emergency brake valve. The emergency brake valve is a 3/2 way magnetic valve, which in the unexcited state directs the emergency brake pressure, and in the excited state the brake pressure, to a brake cylinder. To limit the emergency brake pressure as a function of the vehicle load, this known pressure medium brake requires costly mechanical equipment which is subject to wear. One special advantage of the known pressure medium brake lies in the fact that, in case of a power failure, the limits of the emergency brake pressure continue to be respected, so that maximum braking of the vehicle can still be achieved in accordance with the respective vehicle load.

SUMMARY OF THE INVENTION

The object of the invention is to improve a pressure medium brake of the aforementioned kind in such a manner that it guarantees that the vehicle load-dependent limitation of the emergency brake pressure is preserved even in case of a power failure, while largely mechanical control devices, in particular by the adjusting cam device such as the known pressure medium brake.

This problem is solved according to the invention by means of (a) an electric pressure means (EP) converter which is closed in the currentless state, and which converts the electrical vehicle load signal into a vehicle load-dependent pressure medium pressure, and (b) a pressure medium-based limiting valve downstream of said EP converter. The latter valve comprises piston pressurized by the vehicle load-dependent pressure medium pressure opposing the emergency brake pressure to be fed to the emergency brake valve, in order to switch a shutoff valve which is arranged in a connection between a pressure medium source under a pressure adequate for maximum braking, and a chamber under emergency brake pressure.

The term "EP converter" used above is intended to designate an electric pressure medium converter of any design, which can convert an analog or digital electric current or voltage signal into a suitable pressure medium pressure.

BRIEF DESCRIPTION OF THE DRAWINGS

In order that the invention may be more clearly understood, it will now be described with reference to the accompanying drawings several embodiments of pressure medium brakes according to the invention are shown for purpose of illustration.

DESCRIPTION OF PREFERRED EMBODIMENTS

Figure 1:
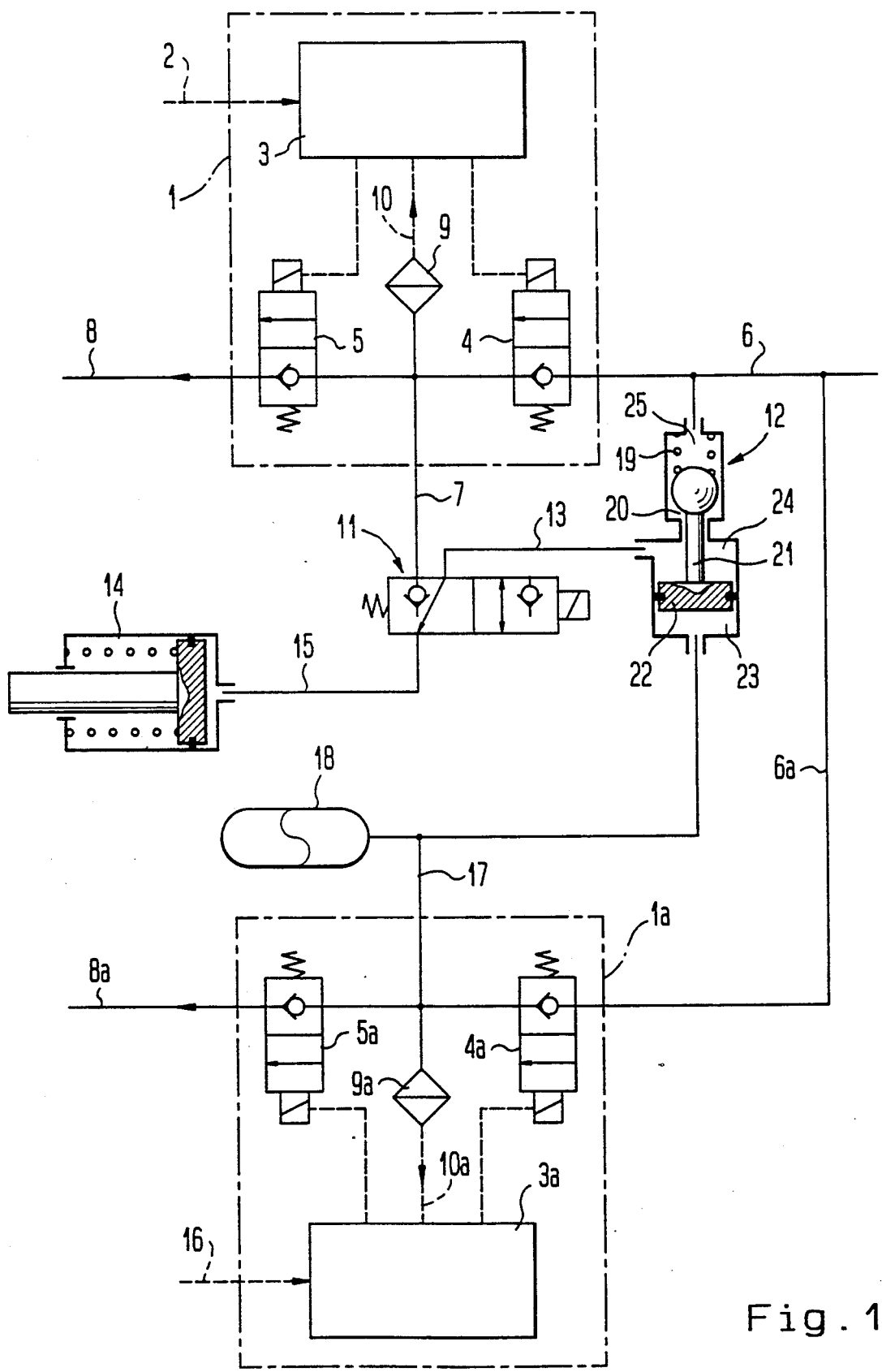
FIG. 1 shows schematically a first embodiment of the invention.

The brake system according to FIG. 1 comprises an EP converter, to which an electric analog or digital brake request signal is fed by means of an electric signal line 2. EP converter 1 comprises electronics 3 and two 2/2 way magnetic valves that can be excited by said electronics by means of cables (shown in dashed lines) and of which one is an inlet valve 4 and the other is an outlet valve 5. Inlet valve 4 is supplied with pressure medium from a pressure medium source (not shown) by means of a line 6 and controls the connection of this line 6 to a line 7 carrying a brake pressure; outlet valve 5 controls a connection of line 7 to a line 8, which leads to a vacuum chamber, in the case of a compressed air brake to atmosphere and in the case of a hydraulic brake to the hydraulic supply tank. Line 7 is attached within EP converter 1 to a converter 9, which converts the pressure prevailing in line 7 into an electric signal, which is returned as the actual value by a signal line 10 of electronics 3.

Line 7 leads to an emergency brake valve 11, which is a 3/2 way magnetic valve and that is unexcited only in states of emergency, for example when passengers actuate the emergency brake handle, when the train separates unintentionally, when the power fails, and the like. Furthermore, a line 13 connecting the emergency brake valve to a limiting valve 12, and a line 15 leading to a brake cylinder 14, are connected to the emergency brake valve 11. In the excited state, the emergency brake valve 11 connects line 7 to line 15 and shuts off line 13, whereas in the illustrated, unexcited state it connects lines 13 and 15 to one another and blocks line 7.

The pressure medium source is connected to a second EP converter 1a by means of a line 6a branching off from line 6 as the feed line. This second EP converter 1a is similar to EP converter 1, and its parts are denoted by the same reference numerals, supplemented by the letter a. EP converter 1a is designed in such a manner that, when the power or drive signal fail, i.e., in a currentless state, both the inlet and the outlet valve 4a and 5a are closed. EP converter 1 can be designed to match. In contrast to EP converter 1, EP converter 1a can, however, be driven by an electric signal line 16, which carries an analog or digital electric signal corresponding to the vehicle load; and it drives out correspondingly a pressure medium pressure, corresponding to the vehicle load, into a line 17 by means of its inlet valve 4a or outlet valve 5a. A pressure medium reservoir 18 and limiting valve 12 are attached parallel to one another to line 17.

Limiting valve 12 comprises a shutoff valve 20 which is loaded by a spring 19 in the closing direction and which can be held in the open position by means of a plunger 21 of a piston 22. Piston 22 is pressurized in the open direction of shutoff valve 20 by the pressure in a chamber 23, which is attached to line 17, and thus the chamber is filled by the vehicle load-dependent pressure medium pressure. On the other hand, piston 22 defines a chamber 24, which is attached to line 13 and which can be connected to chamber 25, which is attached to line 6 and receives spring 19, by means of shutoff valve 20.

During normal driving operations, emergency brake valve 11 is excited and, therefore, drives the brake pressure, driven out by EP converter 1, into cylinder 14 that is designed to be active, i.e., a cylinder delivering braking force corresponding to its admission of pressure medium. At the same time, the EP converter 1a drives a pressure head, corresponding to the respective vehicle load, into line 17 and thus into pressure medium reservoir 18 and chamber 23 of limiting valve 12. Therefore, limiting valve 12 holds open its shutoff valve 20 in such a manner and until a pressure medium pressure which can be called the emergency brake pressure and corresponds to the respective vehicle load is fed from line 16 through the opened shutoff valve 20 into chamber 24 and line 13; subsequently piston 22 drops in order to close shutoff valve 20.

In states of emergency, as already stated above, the emergency brake valve 11 is de-energized, thus allowing the emergency brake pressure in line 13 to reach brake cylinder 14; the consumption of pressure medium from line 13 is resupplied by temporarily opening shutoff valve 20. When the emergency situation has terminated, the emergency brake valve 11 is excited again; the emergency brake pressure prevailing in brake cylinder 14 can be reduced by the EP converter 1.

When the power fails, EP converter 1a goes over in any case into its closed state, blocking line 17 with respect to both line 6a and output line 8a; thus, the vehicle load-dependent pressure medium pressure directed into line 17 and pressure medium store 18 is preserved and directs a corresponding emergency brake pressure, limited as a function of the vehicle load, into line 13 by means of limiting valve 12. Thus, the pressure medium reservoir 18 ensures that the vehicle load-dependent pressure medium pressure prevailing in line 17b also preserved with certainty over longer, currentless time intervals. If there is a comprehensive power failure, even emergency brake valve 11 is de-energized; as described above, the result is an emergency braking with an emergency brake pressure, limited as a function of the vehicle load, from line 13. If, however, the power failure effects only EP converter 1a and/or the electric signal generation for signal line 16, emergency brake valve 11 can remain excited and other brake control processes can be produced by EP converter 1.

The vehicle load-dependent signal existing in signal line 16 can also be fed in the manner that is not apparent from FIG. 1 to EP converter 1 or to a device which generates the brake request signal existing in signal line 2; in both designs the vehicle load-dependent signal can be used to the effect that EP converter 1 drives out into line 7 a brake pressure which is modulated in accordance with the respective existing vehicle load. At variance with the described embodiment, it is also possible not to feed the pressure of the pressure medium source to EP converter 1a as the feed pressure but rather analogously to the aforementioned EP-B-0 173 861 the emergency brake pressure, limited as a function of the vehicle load, from line 13 or also from the pressure medium pressure from line 17.

Figure 2:
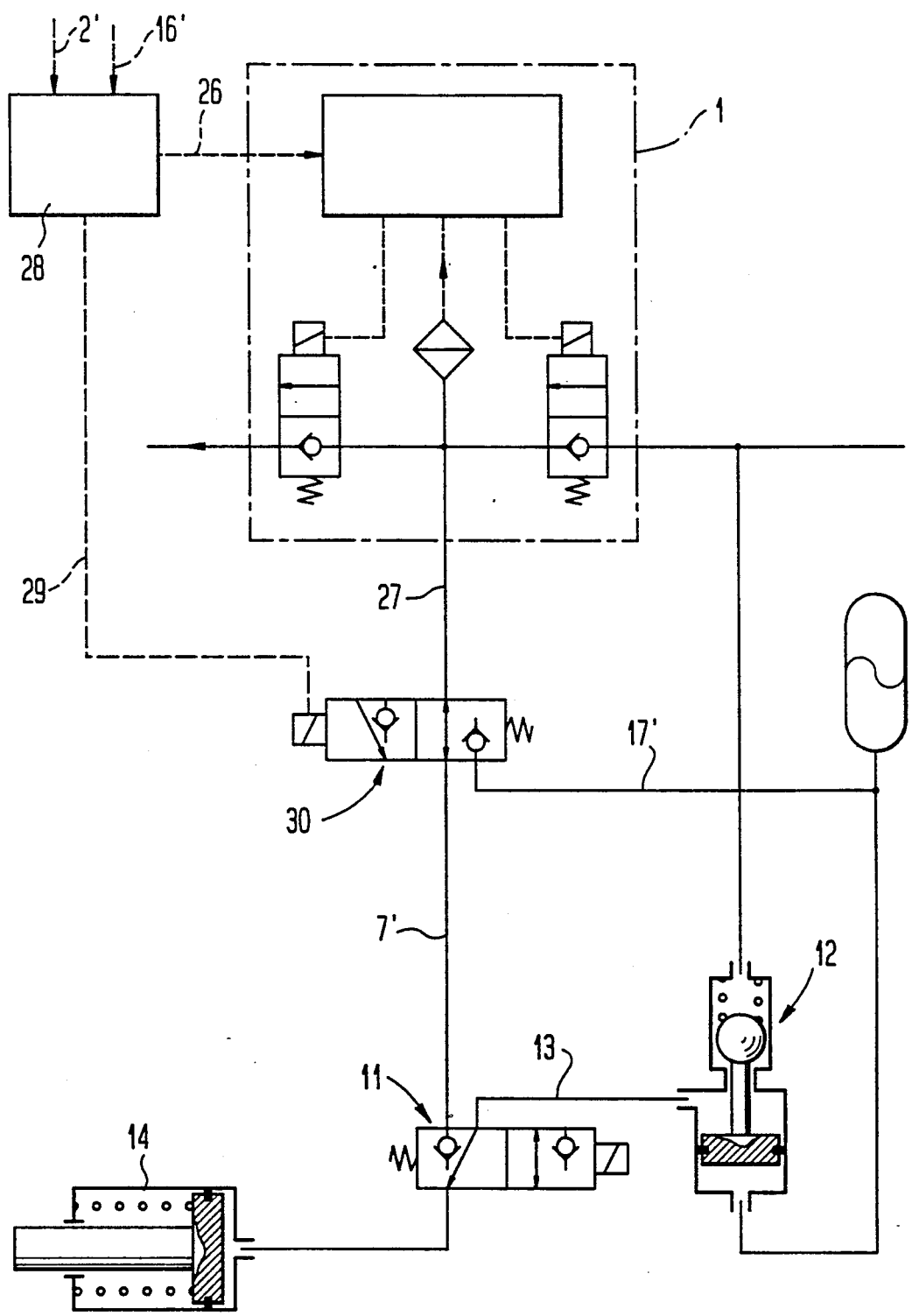
FIG. 2 shows schematically a second embodiment.

In the case of the pressure medium brake according to FIG. 2, there is only one EP converter 1, whose design corresponds to that of FIG. 1, which, however, deviating from an electric reference input signal can be driven in a signal line 26 and drives out into a line 27 a pressure medium pressure corresponding to this reference input signal. The brake request signal existing in signal line 2' and the vehicle load-dependent signal existing in signal line 16' are fed to electronics 28, which feeds the desired signal into signal line 26. When a brake request signal corresponding to braking exists in signal line 2', electronics 28 directs this brake request signal into signal line 26. By contrast, when this brake request signal corresponds to brake release, and possibly there is a further signal to be fed via a signal line (not shown) for a specific driving state, electronics 26 feeds, the vehicle load-dependent signal existing in signal line 16' to signal line 26. The further signal can be generated as a function of the opening or closing state of the vehicle doors, motion or standstill of the vehicle, or the actuation of a hand brake (not shown). The electronics 28 can be designed in such a manner that it feeds the vehicle load-dependent signal to signal line 26 only when the vehicle doors are opened, the vehicle is at a standstill and/or the vehicle brake is actuated; otherwise, it feeds the brake request signal in any event. Thus, the parking brake can be a separate brake (not shown); however, the parking brake can also be actuated by arbitrarily de-energizing emergency brake valve 11 when the vehicle is at a standstill. In the case of such a design of electronics 28, the aforementioned dependency on the existence of a brake request signal corresponding to an actuated or triggered braking can be dispensed with if required. Furthermore, a switching line 29 leads from electronics 28 to a switching valve 30, designed as a 3/2 way magnetic valve, where the voltage or current conduction of switching line 29 is controlled in such a manner by electronics 28 that switching valve 30 is excited only when a vehicle load-dependent signal is available in signal line 26. In the illustrated, unexcited state, switching valve 30 connects line 27 to line 7' carrying the brake pressure, whereas in the excited state it connects line 27 to line 17' carrying the vehicle load-dependent pressure medium pressure. Moreover, in view of the emergency brake valve 11, brake cylinder 14, limiting valve 12 and pressure medium reservoir 18, the pressure medium brake of FIG. 2 corresponds to that of FIG. 1, so that further explanation is superfluous.

During normal driving operations, with closed vehicle doors, vehicles enroute and/or with unactuated parking brake, electronics 28 feeds in any event the brake request signal existing in signal line 2' into signal line 26, so that EP converter 1 drives out into line 27 a corresponding brake pressure, which reaches brake cylinder 14 through the unexcited switching valve 30, line 7' and excited emergency brake valve 11. In case of emergency, emergency brake valve 11 is de-energized so that an emergency brake pressure limited as a function of the vehicle load and existing in line 13 is fed to brake cylinder 14 through emergency brake valve 11, as described above with respect to FIG. 1.

With a brake request signal, corresponding to triggered braking, in signal line 2' and optionally with another signal corresponding to opened vehicle doors, still standing vehicle and/or actuated parking brake, the vehicle load-dependent signal directed from electronics 28 into signal line 26 brings about that EP converter 1 according to FIG. 2 drives out a vehicle load-dependent pressure medium pressure into line 27. Since electronics 28 simultaneously excites switching valve 30 by means of switching line 29, this vehicle load-dependent pressure medium pressure is fed from line 27 into line 17 and fills the pressure medium reservoir 18 as well as controls limiting valve 12, as already described with respect to FIG. 1. When electronics 28 is reset in such a manner that it directs the brake request signal in turn into signal line 26, switching valve 30 severs line 17' from line 27; and the pressure medium pressure that corresponds to the momentary vehicle load and prevails in pressure medium reservoir 18 remains preserved and limits the emergency brake pressure prevailing in line 13 as a function of the vehicle load by means of limiting valve 12, as already described above with respect to FIG. 1.

As a variant of the above described embodiments, limiting valve 12 can also be provided, in addition to its shutoff valve 20, with an outlet valve (not illustrated) by means of which the emergency brake pressure prevailing in line 13 can be reduced when the vehicle load-dependent pressure available in pressure medium reservoir 18 has decreased; the outlet valve and shutoff valve 20 can be combined, as is common practice, into a two way valve.

If the pressure medium brake according to FIGS. 1 or 2 is equip with an indirectly acting spring-loaded brake cylinder rather than a direct acting brake cylinder 14, in corresponding reverse manner a pressure medium source must be connected to line 8, and atmosphere or the pressureless hydraulic supply tank to line 6; line 6a must be attached correspondingly to line 8 and line 8a to line 6. If the pressure medium pressure is also directed in line 17 or 17' in inverse ratio to the vehicle load, a limiting valve 12' according to FIG. 3 must be provided, in lieu of limiting valve 12.

Figure 3:
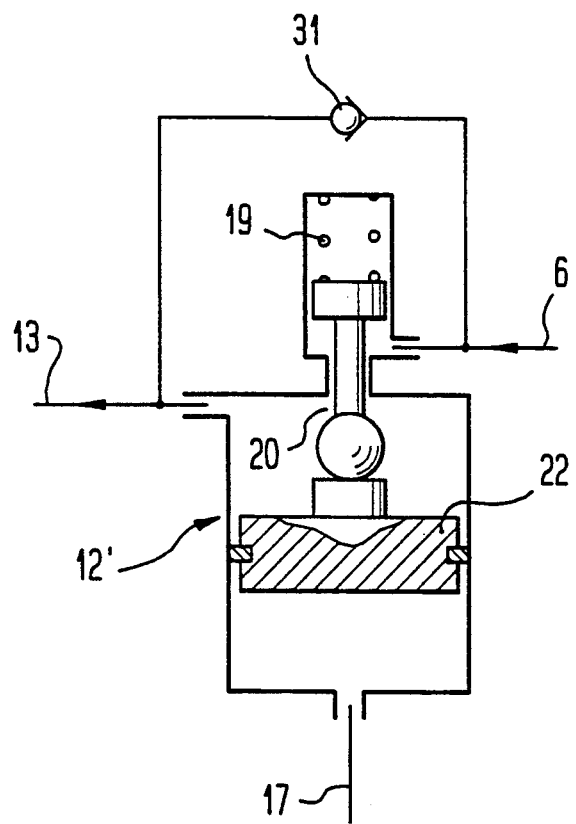
FIG. 3 shows schematically a limiting valve.

Limiting valve 12' according to FIG. 3 differs from limiting valve 12 shown in FIG. 1 in that shutoff valve 20 is stressed by piston 22 in the closing direction and by spring 19 in the opening direction, and that shutoff valve 20 is bridged by a non-return valve 31 opening in the flow direction, of line 13. As a result of this modification, by means of limiting valve 12' a pressure decrease from line 13, carrying emergency brake pressure, by means of shutoff valve 20 to line 6, leading to a pressureless chamber, is possible to a degree limited by the inversely vehicle load-dependent pressure medium pressure; the vehicle load-dependent pressure medium pressure is supplied through line 17. Since the spring-loaded brake cylinder develops its braking force as the pressure drops, the braking force it delivers is limited as a function of the vehicle load. Non-return valve 31 prevents the emergency brake pressure in line 13 can drop below the pressure prevailing in line 6 under any circumstances, a state that could lead to failures, especially with hydraulic systems.

At a variant of FIG. 3, limiting valve 12', as described with respect to limiting valve 12, can be equipped with a two way valve by means of whose part (not illustrated) the emergency brake pressure available in line 13 can be raised again when the vehicle load decreases.

What is claimed is:

1. Electrically controllable pressure medium brake for vehicles having wheels, with a control system that can be controlled with an electrical brake request signal to generate a brake pressure for a brake cylinder during normal operation corresponding to the brake request signal, wherein the control system comprises an emergency braking device effective in emergencies to generate an emergency brake pressure that corresponds to a maximum braking force possible without locking said wheels, and that is defined by an electric vehicle load signal as a function of vehicle load, and with an emergency brake valve (11), which feeds the brake pressure to a brake cylinder (14) during normal operation and feeds an emergency brake pressure to said brake cylinder in an emergency by blocking the brake pressure, said pressure medium brake comprising
    (a) a first electric pressure means, EP, converter (1a; 1) which is closed in a currentless state and which converts the electrical vehicle load signal into a vehicle load-dependent pressure medium pressure; and
    (b) a pressure medium-based limiting valve (12; 12') downstream of said first EP converter and comprising a piston (22) pressurized by the vehicle load-dependent pressure medium pressure against the emergency brake pressure to be fed to the emergency brake valve (11) in order to switch a shutoff valve (20), which is arranged in a connection between a pressure medium source line (6), under a pressure that is at least sufficient to achieve maximum braking, and a chamber (line 13) under the emergency brake pressure.

2. Pressure medium brake, according to claim 1, comprising a pressure medium reservoir (18) pressurized by the vehicle load-dependent pressure medium pressure.

3. Pressure medium brake, according to claim 1 or 2, wherein the emergency brake pressure valve (11) is a 3/2 way magnetic valve, which feeds to the brake cylinder (14) the emergency brake pressure in the unexcited state and the brake pressure in the excited state.

4. Pressure medium brake, according to claim 1 or 2, comprising a second EP converter (1, 1a), wherein said first EP converter (1) generates the brake pressure as a function of the brake request signal and said second EP converter (1a) generates the vehicle load-dependent pressure medium pressure.

5. Pressure medium brake, according to claim 1 or 2, comprising a common EP converter (1) to generate both the brake pressure and vehicle load-dependent pressure medium pressure.

6. Pressure medium brake, according to claim 5, wherein at least when the brake request signal corresponding to braking exists, said brake request signal is fed to said common EP converter (1); when a brake request signal corresponding to a brake release exists together with a possible further signal denoting a specific driving state, the electric vehicle load signal is fed to said common EP converter; and the output (line 27) of the EP converter (1) is connected to the emergency brake valve (11) by means of a switching valve (30) when said brake request signal exists at said switching valve; when a vehicle load signal exists, said output is connected to a chamber (line 17') carrying the vehicle load-dependent pressure medium pressure.

7. Pressure medium brake, according to claim 6, wherein said switching valve (30) is a 3/2 way magnetic valve which is excited only when the vehicle load signal is available at said first EP converter (1), and which switching valve connects the output (line 27) of said first EP converter (1) in the excited state to the chamber (line 17') carrying the vehicle load-dependent pressure medium pressure, and which switching valve connects the output (line 27) in the unexcited state to the emergency brake valve (11).

8. Pressure medium brake, according to claim 1 or 2, wherein the brake cylinder (14) acts directly and the vehicle load-dependent pressure medium pressure corresponds to the vehicle load, wherein the vehicle load-dependent pressure medium pressure pressurizes the piston (22) of the limiting valve (12) in the opening direction of said shutoff valve (20).

9. Pressure medium brake, according to claim 1 or 2, wherein the brake cylinder is an indirectly acting spring-loaded cylinder, wherein the vehicle load-dependent pressure medium pressure is inversely proportional to the vehicle load, and pressurizes the piston (22) of the limiting valve (12') in a closing direction of the shutoff valve (20).

* * * * *